（12）United States Patent
Vermeer

(10) Patent No.: US 9,586,172 B2
(45) Date of Patent: *Mar. 7, 2017

(54) DRYER FOR COMPRESSED GAS

(71) Applicant: ATLAS COPCO AIRPOWER naamloze vennootschap, Wilrijk (BE)

(72) Inventor: Constantijn Friso Vermeer, Deurne (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 265 days.

This patent is subject to a terminal disclaimer.

(21) Appl. No.: 14/077,539

(22) Filed: Nov. 12, 2013

(65) Prior Publication Data

US 2014/0069278 A1 Mar. 13, 2014

Related U.S. Application Data

(63) Continuation of application No. 13/386,909, filed as application No. PCT/BE2010/000053 on Jul. 29, 2010, now Pat. No. 8,608,831.

(30) Foreign Application Priority Data

Aug. 11, 2009 (BE) .................................. 2009/0484

(51) Int. Cl.
*B01D 53/26* (2006.01)
*B01D 53/06* (2006.01)
*F24F 3/14* (2006.01)

(52) U.S. Cl.
CPC ........... *B01D 53/06* (2013.01); *B01D 53/261* (2013.01); *F24F 3/1423* (2013.01)

(58) Field of Classification Search
CPC .. B01D 53/06; B01D 53/261; B01D 2257/80; F24F 3/1423
USPC .......... 95/113–115, 117, 121–123, 125, 148; 96/125, 144; 34/80, 472, 473; 62/94, 271
See application file for complete search history.

(56) References Cited

U.S. PATENT DOCUMENTS

| 4,409,006 A | 10/1983 | Mattia |
| 4,729,774 A | 3/1988 | Cohen et al. |
| 4,783,432 A | 11/1988 | Settlemyer |
| 5,667,560 A | 9/1997 | Dunne |

(Continued)

FOREIGN PATENT DOCUMENTS

| DE | 3814175 A1 | 11/1988 |
| DE | 3902977 | 8/1989 |

(Continued)

OTHER PUBLICATIONS

International Search Report in PCT/BE2010/000053, Dec. 23, 2010.

*Primary Examiner* — Frank Lawrence
(74) *Attorney, Agent, or Firm* — Bacon & Thomas, PLLC

(57) ABSTRACT

A compressed gas dryer is provided with a drying zone and a regeneration zone, and a drum rotatable in the housing containing a drying agent that is transferred successively through the drying zone and the regeneration zone, whereby said regeneration zone comprises a first subzone having a first inlet to supply a first regeneration gas flow, and a second subzone having a second inlet to supply a second regeneration gas flow of which the relative humidity is lower compared to that of the first regeneration gas flow; and that an outlet of said drying zone is connected via a connection conduit to the second inlet of the second subzone.

20 Claims, 3 Drawing Sheets

(56) References Cited

U.S. PATENT DOCUMENTS

| | | | |
|---|---|---|---|
| 5,701,762 | A | 12/1997 | Akamatsu et al. |
| 6,165,254 | A | 12/2000 | Kawakami et al. |
| 6,294,000 | B1 | 9/2001 | Klobucar |
| 6,375,722 | B1 | 4/2002 | Henderson et al. |
| 6,666,911 | B2 | 12/2003 | Chou et al. |
| 7,338,548 | B2 | 3/2008 | Boutall |
| 7,569,095 | B2 | 8/2009 | Vanderstraeten et al. |
| 7,789,942 | B2 | 9/2010 | Vanderstraeten et al. |
| 8,328,904 | B2 | 12/2012 | Griffiths et al. |

FOREIGN PATENT DOCUMENTS

| | | |
|---|---|---|
| DE | 102006022293 A1 | 11/2007 |
| EP | 0566180 A1 | 10/1993 |
| EP | 1809406 A1 | 7/2007 |
| JP | 5115736 | 5/1993 |
| JP | H05-200233 A | 8/1993 |
| JP | 6343818 | 12/1994 |
| JP | H06-343818 A | 12/1994 |
| JP | H06-343819 A | 12/1994 |
| JP | 1085546 | 4/1998 |
| JP | 10-305208 A | 11/1998 |
| JP | 2001179036 | 7/2001 |
| JP | 2002-186822 A | 7/2002 |
| WO | 00/74819 A1 | 12/2000 |
| WO | 01/78872 A2 | 10/2001 |
| WO | 0238251 A1 | 5/2002 |
| WO | 2005/070518 A1 | 8/2005 |
| WO | 2006/050582 A1 | 5/2006 |
| WO | 2007/131627 A1 | 11/2007 |

DRYER FOR COMPRESSED GAS

CROSS REFERENCE

This application is a continuation application claiming the benefit of U.S. patent application Ser. No. 13/386,909, filed Jan. 25, 2012, granted as U.S. Pat. No. 8,608,831, which is the national stage application of PCT/BE2010/000053, filed Jul. 29, 2010, which claims the benefit of Belgium application BE 2009/0484, filed Aug. 11, 2009, the entirety of said applications being incorporated herein by reference.

BACKGROUND OF THE INVENTION

The present invention relates to a method for drying a compressed gas and a compressor installation provided with a dryer.

Specifically, the invention relates to a dryer provided with a rotating drum with therein a regenerable drying agent, which drying agent, as a consequence of the rotation of the drum, is alternately brought through two zones of the dryer, whereby in one zone, in particular, a drying zone, said drying agent is used for drying a compressed gas, and in the other zone, more specifically, a regeneration zone, said drying agent is regenerated by bringing this drying agent into contact with a hot gas.

As a result of the rotation of the drum, regenerated drying agent will end up in the drying zone. In order to improve the performances of the dryer, it is suitable and common to provide a third zone, indicated as cooling zone, in the drum, which cooling zone allows to cool the drying agent such that said drying agent can adsorb substantially more moisture.

When such a dryer is used for drying a compressed gas coming from a compressor, a portion of said compressed gas is cooled to be guided subsequently through the drying zone of the dryer, whereby the drying agent in this drying zone extracts moisture from said gas, which consequently results in a dry gas with a low pressure dew point.

The remaining fraction of the compressed gas coming from the compressor and still being hot due to the compression, is guided through the regeneration zone of the dryer, whereby said hot gas desorbs the moisture present in the drying agent, whereby the drying agent is regenerated to allow subsequently, in a new cycle, to be used again in the drying zone to dry the compressed gas.

A disadvantage is that the compressed gas used for regeneration has a relatively high humidity, as a result of which the drying efficiency is not optimal.

The above has the unfavourable result that, when the drying agent is subsequently brought into the drying zone, this drying agent can only absorb a rather limited amount of moisture from the gas being guided through said drying zone.

The heat of the compressed gas is used to regenerate the drying agent in the regeneration zone, whereby it should be noted that, as the temperature of the compressed gas rises, the drying process improves and the efficiency of the installation increases accordingly.

The temperature of the compressed gas used for regeneration, can be raised by installing a heating element or the like, before guiding this gas through the regeneration zone.

A disadvantage thereof is that the heating of the gas flow, used for regeneration, is quite expensive in view of the continuously increasing energy prices.

The invention aims to overcome one or more of said and/or other disadvantages.

SUMMARY OF THE INVENTION

To that end, the invention relates to a compressor installation provided with a compressor having an outlet, and with a dryer provided with a housing with therein a drying zone and a regeneration zone, and a drum rotatable in the housing with therein a regenerable drying agent and driving means for the rotation of the drum such that the drying agent is moved successively through the drying zone and through the regeneration zone, whereby the outlet of the compressor is connected via a pressure conduit to an inlet of the drying zone; whereby said regeneration zone comprises at least two subzones, namely, a first subzone having a first inlet for the supply of a first regeneration gas flow, and a second subzone having a second inlet for the supply of a second regeneration gas flow; whereby to said pressure conduit, between the compressor and the inlet of the drying zone, a branch is connected that connects to said first inlet of the first subzone; and whereby an outlet of said drying zone connects via a connection conduit to the second inlet of the second subzone, such that the relative humidity of said second regeneration gas flow is lower than that of the first regeneration gas flow. An advantage of a compressor installation according to the invention is that the drying agent in the second subzone comes into contact with a gas flow of which the moisture content is considerably lower compared to the gas flow flowing through the first subzone for regenerating the drying agent in the conventional way.

Consequently, during the regeneration phase, even more moisture can be removed from the drying agent than in the conventional way, in other words, in this way a further drying occurs, which can be referred to as deep drying, causing the drying agent to adsorb more moisture from the gas to be dried in a further drying phase. A dryer according to the invention therefore has a better performance.

According to a preferred embodiment of a compressor installation according to the invention, a heat exchanger is provided in said connection conduit.

An advantage thereof is that the second regeneration gas flow, before being guided through the second subzone, can be heated by means of said heat exchanger, as a result of which said gas flow can remove more moisture from the drying agent.

As the temperature of the gas used for regeneration rises, the drying process will improve and the efficiency of the dryer will increase accordingly.

Another advantage is that it is not necessary to heat the complete gas flow through the regeneration zone, but solely the second regeneration gas flow directed through the second subzone.

This brings along a number of advantages since a relatively small heat exchanger can be used, which results in an energy-saving and compact installation.

The invention also relates to a method for drying a compressed gas coming from an outlet of a compressor, in which method a dryer is used provided with a housing with therein a drying zone and a regeneration zone, and a drum rotating in the housing, with therein a regenerable drying agent, whereby the drying agent is moved successively through the drying zone and through the regeneration zone, and whereby the compressed gas to be dried is guided through the drying zone while a regeneration gas is guided through the regeneration zone, whereby said regeneration zone is divided into a first subzone through which a first regeneration gas flow, in the form of a hot, compressed gas coming from the outlet of the compressor, is guided, and a second subzone through which a second regeneration gas flow is guided, and whereby the second regeneration gas flow has a lower relative humidity than the first regeneration gas flow, and whereby the second regeneration gas flow is composed of a fraction of compressed gas that exits an outlet of the drying zone.

BRIEF DESCRIPTION OF THE DRAWINGS

In order to better explain the characteristics of the present invention, a number of preferred embodiments of a dryer and compressor installation according to the invention, as well as a method for drying a compressed gas, are described by way of example, without being limitative in any way, with reference to the accompanying drawings, whereby.

DETAILED DESCRIPTION OF THE INVENTION

Figure 1:
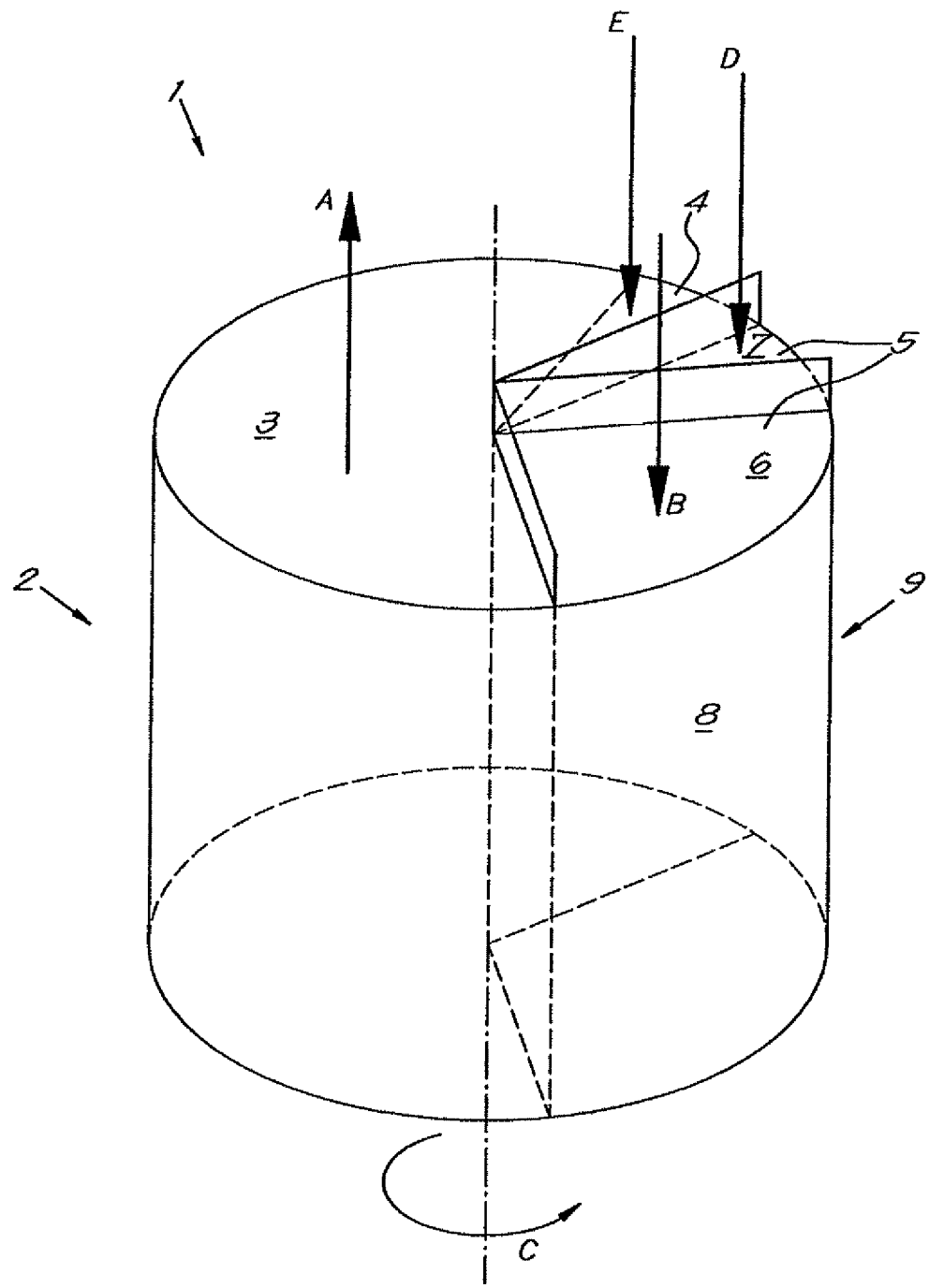
FIG. 1 represents schematically and in perspective view a part of a dryer of a compressor installation according to the invention.

FIG. 1 shows a part 1 of a dryer of a compressor installation according to the invention, for compressed gas. The part 1 of the dryer is provided with a housing 2 with therein a drying zone 3, a cooling zone 4 and a regeneration zone 5 which, according to the specific characteristic of the invention, comprises two subzones, a first subzone 6 and a second subzone 7 respectively.

Preferably, said first subzone 6 connects to the end of drying zone 3, while the second subzone 7 connects to the first subzone 6 and is followed by the cooling zone 4 which in its turn connects to the beginning of the drying zone 3.

Therefore, the first subzone 6 is situated at the beginning of the regeneration zone 5, or in other words, at the part of the drying zone 3 via which, during operation of the dryer, the moist drying agent 8 enters the regeneration zone, while the second subzone 7 is situated at the end of the regeneration zone 5, or, in other words, at the part of the regeneration zone via which the regenerated drying agent 8 exits the regeneration zone 5 and enters the cooling zone 4.

By "the end of the drying zone 3" is meant, the part of the drying zone 3 via which the humid drying agent 8 exits the drying zone 3 during rotation of the drum 9, whereas by "the beginning of the drying zone 3" is meant, the part of the drying zone 3 in which fresh regenerated drying agent 8 enters.

A rotating drum 9 is mounted in the housing 2 in which drum 9 is provided a drying agent 8, or so-called desiccant.

The dryer 1 is also provided with driving means, not represented in the figures, for example in the shape of a motor, for enabling the rotation of the drum 9 such that the drying agent 8 is moved successively through the drying zone 3, the regeneration zone 5 and the cooling zone 4.

Figure 2:
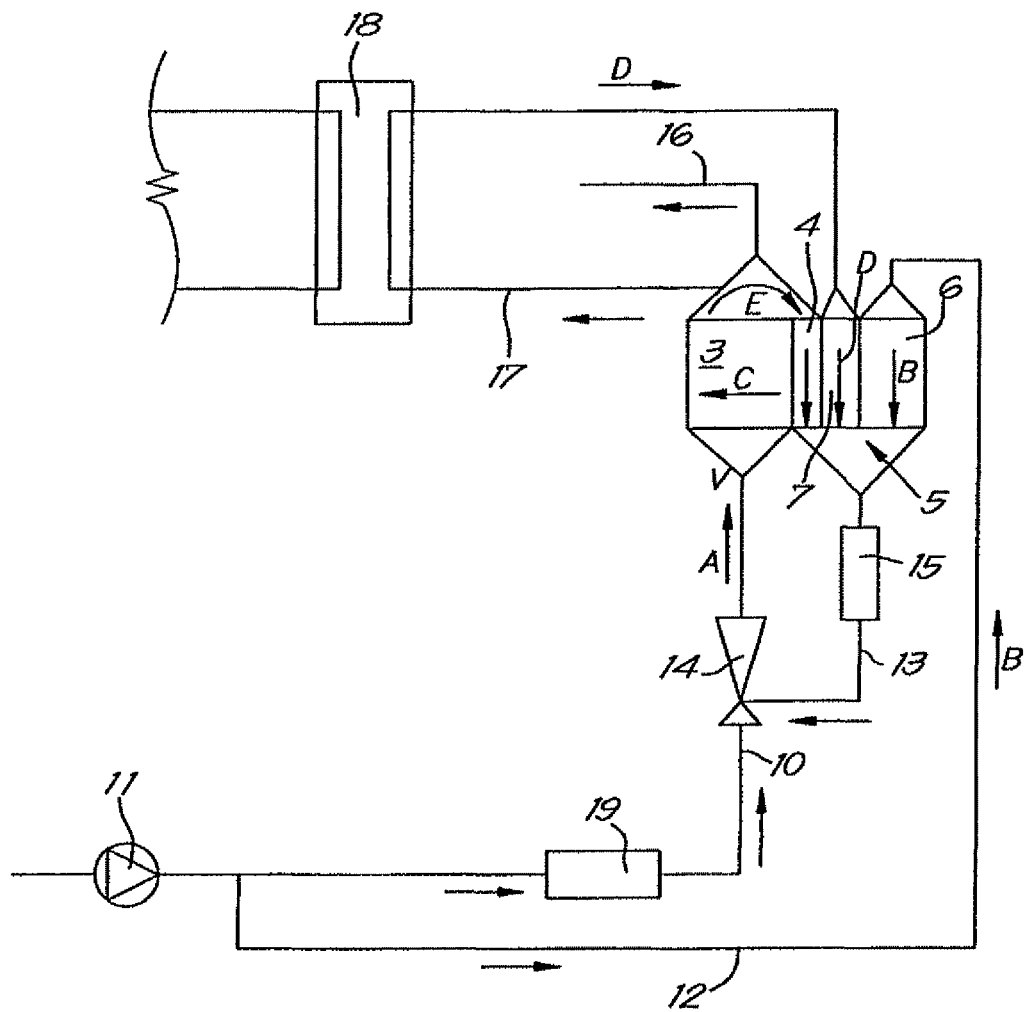
FIG. 2 represents schematically a compressor installation according to the invention.

FIG. 2 shows a compressor installation according to the invention which comprises, besides said part 1, a pressure conduit 10 making a connection between the outlet of a compressor 11 and an inlet of the drying zone 3. The compressor 11 also forms part of the compressor installation.

To said pressure conduit 10, between the outlet of the compressor 11 and the inlet of the drying zone 3, a branch 12 connects, which is connected to a first inlet of said first subzone 6.

Furthermore, a return conduit 13 is provided for the gas flows, used for regeneration and cooling, which return conduit 13 connects the common outlet, of the first and second subzones 6 and 7 of the regeneration zone 5 and of the cooling zone 4, to the pressure conduit 10 and ends up therein nearby a venturi 14 provided in the pressure conduit 10. A cooler 15 is provided in this return conduit 13.

At the outlet of the drying zone 3 is provided, on the one hand, a take-off point 16 along which the dried gas can be discharged for further use and, on the other hand, with a connection conduit 17 which guides a fraction of the dried gas through the secondary side of a heat exchanger 18, and subsequently guides this fraction through the second subzone 7 of the regeneration zone 5.

In the pressure conduit 10 an aftercooler 19 is provided between the compressor 11 and the venturi 14.

The method according to the invention for drying a compressed gas, is very simple, and as follows.

The flow directions are indicated in the figures. Arrow A shows the flow direction of the main flow through the drying zone 3 of the dryer. The flow direction of the remaining gas flows through the regeneration- and cooling zone, is, in the example as shown, directed opposite with respect to the flow direction A of the main flow, as illustrated by arrows B, D and E. Arrow C indicates the sense of rotation of the drum 9 in the housing 2 of the dryer.

The gas to be dried, coming from the compressor 11 or at least a substantial portion thereof, flows, in the form of a main flow, after passage through the aftercooler 19, through the drying agent 8 in the drying zone 3 towards the outlet of the drying zone 3, whereby, by making contact with the drying agent 8, the moisture is adsorbed by said drying agent 8. The gas dried in that way, is discharged via a take-off point 16 towards a consumers network situated downstream.

The drum 9 transfers the moisture-laden drying agent 8 to the first subzone 6 of the regeneration zone 5, where the moisture in the drying agent 8 is desorbed by contacting this drying agent 8 with a first regeneration gas flow in the form of a hot, compressed gas that, via branch 12, is supplied from the outlet of the compressor 11, to accomplish as such a first regeneration of the drying agent 8, making use of the heat of compression present in said first regeneration flow.

According to the specific characteristic of the invention, at the ending of the movement of the drying agent 8 through the regeneration zone, this drying agent is dried further in the second subzone 7 of the regeneration zone 5, than was possible until now, by bringing the drying agent 8 into contact with a second regeneration gas flow of which the relative humidity is lower than that of the first regeneration gas flow.

To this aim, the second regeneration gas flow in this case consists of gas that is branched off from the dried gas that exits the drying zone 3 and that, before being supplied to the regeneration zone 5 via the inlet of the second subzone 7, is guided through the secondary side of the heat exchanger 18, in which said gas flow is heated, in order to lower the partial pressure of the water present in this gas.

It is clear that in this way the moisture content of the drying agent 8 during regeneration can be reduced considerably due to the fact that the drying agent 8 is after-dried in the second subzone 7 of the regeneration zone 5 by making use of a hot, dry gas having low relative humidity. This is the most important advantage of the dryer and method according to the invention.

As the drum 9 rotates further, more moisture is being withdrawn from the drying agent 8, until the drying agent 8 reaches the drying zone 3, after first being cooled in the cooling zone, disposed of the adsorbed moisture, such that the drying agent 8 regenerated as such can be used during a subsequent cycle of drying in the drying zone 3.

As such, the drying agent 8 is guided alternately through the drying zone 3 and subsequently through the regeneration zone 5, in a continuous or discontinuous movement of revolution.

According to the invention, it is appropriate that a fraction of the dried main gas flow is used for cooling the hot regenerated drying agent 8 at the transition between the regeneration zone 5 and the drying zone 3 in the cooling zone 4, before said drying agent 8 comes into contact with the main flow in the drying zone 3.

The presence of such a cooling zone 4 is after all advantageous in that the main flow is not coming into contact with hot drying agent 8 that is not able to adsorb liquid and that would cause the humid gas to leak through the dryer 1. Consequently, in this manner the drying is optimised.

Thanks to the venturi 14 a local pressure drop is generated in a known way, which results in that the outlet of the regeneration zone 5 remains under a lower pressure than at the outlet of the drying zone 3 situated at the opposite side of the drum 9, as a result of which a fraction of the cool main gas flow from the outlet of the drying zone 3 flows towards the outlet of the regeneration zone 5, through the cooling zone 4 situated between drying zone 3 and regeneration zone 5.

By guiding this flow through the cooling zone 4, the hot regenerated drying agent 8 will be cooled with advantageous effect, before said drying agent 8 is used to dry the main gas flow.

The lower pressure described above further causes the gas coming from the drying zone 3, to flow through the heat exchanger 18, towards the second subzone 7. Said flow is in particular made possible by taking off dry gas at the correct position, namely at a position where the dynamic pressure is the lowest. Thus, no blowers are required for this system.

The gas used for regeneration and cooling of the drying agent 8 is, after flowing through the respective zones, collected and cooled by means of a cooler 15, after which this gas is added to the main gas flow, that, subsequently, in its turn, is guided through the drying zone 3.

Figure 3:
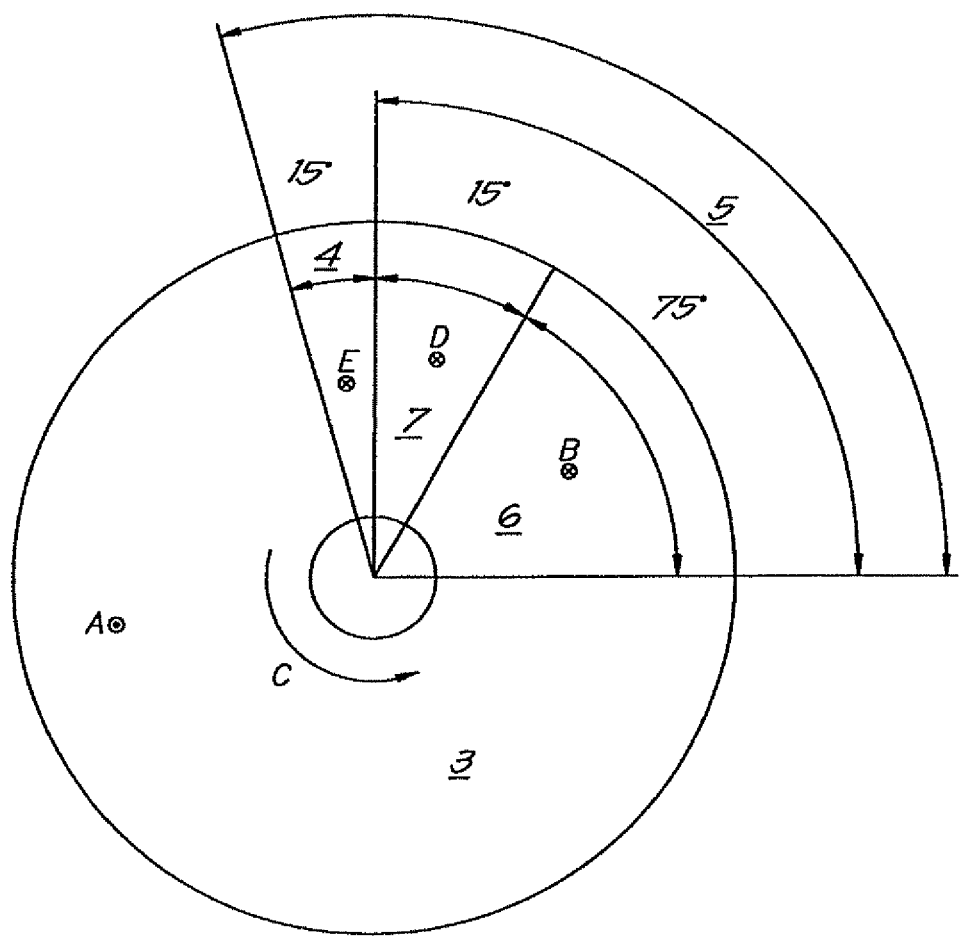
FIG. 3 represents schematically the layout of a part of a dryer of a compressor installation according to the invention.

FIG. 3 shows an example of a schematic lay-out of a part 1 of a dryer according to the invention, whereby the different sectors or zones are made visible.

This figure shows in particular how the regeneration zone 5 is divided into two subzones 6 and 7, whereby in this case the regeneration zone 5 extends over a circumferential angle of almost 90 degrees.

In this case, the first subzone 6 extends over an angle of 75 degrees, while in this example the second subzone 7 extends over an angle in a range from 5 degrees to 30 degrees, and in this case over an angle of almost 15 degrees.

In this example, the drying zone 3 comprises a circle sector of 255 degrees, while the remaining part of 15 degrees, between the second subzone 7 and the drying zone 3, forms the cooling zone 4 in the cylindrical housing 2 of the dryer.

It is clear from the figure in which sense the different zones in the drum 9 are preferably being passed through.

It is clear that the second regeneration gas flow can be heated as well by guiding said flow through a heating element or the like, not represented in the figures.

The gas which is guided through the second subzone 7 should not necessarily come from the dryer itself, however, it can originate from an external source of dried gas as well.

The present invention is by no means limited to the embodiments described by way of example and represented in the drawings, however a compressor installation according to the invention and a method for drying a compressed gas can be realized in many ways, without departing from the scope of invention.

The invention claimed is:

1. A dryer for compressed gas comprising a housing having a drying zone and a regeneration zone therein, and a drum which is configured to rotate in the housing, and comprises a regenerable drying agent therein and a driver for rotation of the drum configured such that the drying agent is moved successively through the drying zone and through the regeneration zone wherein said regeneration zone comprises at least two subzones, namely, a first subzone having a first inlet for a supply of a first regeneration gas flow, and a second subzone having a second inlet for a supply of a second regeneration gas flow, wherein a relative humidity of the second regeneration gas flow is lower than a relative humidity of the first regeneration gas flow, and wherein an outlet of said drying zone connects to the second inlet of the second subzone via a connection conduit, and wherein said second subzone is situated at the end of the regeneration zone.

2. The dryer according to claim 1, wherein the regeneration zone extends over a first circumferential angle of almost 90 degrees and the second subzone extends over a second circumferential angle ranging between 5 degrees and 30 degrees.

3. The dryer according to claim 1, wherein a heat exchanger is provided in said connection conduit.

4. The dryer according to claim 1, wherein the first subzone and the second subzone have a common outlet.

5. The dryer according to claim 4, wherein said common outlet of the first subzone and of the second subzone connects through a return conduit to a pressure conduit, which is configured to supply the compressed gas to be dried, via an aftercooler, to an inlet of the drying zone.

6. The dryer according to claim 1, wherein a temperature of the second regeneration gas flow at the second inlet of the second subzone is larger than or equal to a temperature of the first regeneration gas flow at the first inlet of the first subzone.

7. The dryer according to claim 2, wherein a heat exchanger is provided in said connection conduit.

8. The dryer according to claim 2, wherein the first subzone and the second subzone have a common outlet.

9. The dryer according to claim 3, wherein the first subzone and the second subzone have a common outlet.

10. The dryer according to claim 7, wherein the first subzone and the second subzone have a common outlet.

11. The dryer according to claim 8, wherein said common outlet of the first subzone and of the second subzone connects through a return conduit to a pressure conduit, which is configured to supply the compressed gas to be dried, via an aftercooler, to an inlet of the drying zone.

12. The dryer according to claim 9, wherein said common outlet of the first subzone and of the second subzone connects through a return conduit to a pressure conduit, which is configured to supply the compressed gas to be dried, via an aftercooler, to an inlet of the drying zone.

13. The dryer according to claim 10, wherein said common outlet of the first subzone and of the second subzone connects through a return conduit to a pressure conduit, which is configured to supply the compressed gas to be dried, via an aftercooler, to an inlet of the drying zone.

14. The dryer according to claim 2, wherein a temperature of the second regeneration gas flow at the second inlet of the second subzone is larger than or equal to a temperature of the first regeneration gas flow at the first inlet of the first subzone.

15. The dryer according to claim 3, wherein a temperature of the second regeneration gas flow at the second inlet of the second subzone is larger than or equal to a temperature of the first regeneration gas flow at the first inlet of the first subzone.

16. The dryer according to claim 4, wherein a temperature of the second regeneration gas flow at the second inlet of the second subzone is larger than or equal to a temperature of the first regeneration gas flow at the first inlet of the first subzone.

17. The dryer according to claim 5, wherein a temperature of the second regeneration gas flow at the second inlet of the second subzone is larger than or equal to a temperature of the first regeneration gas flow at the first inlet of the first subzone.

18. The dryer according to claim 11, wherein a temperature of the second regeneration gas flow at the second inlet of the second subzone is larger than or equal to a temperature of the first regeneration gas flow at the first inlet of the first subzone.

19. The dryer according to claim 12, wherein a temperature of the second regeneration gas flow at the second inlet of the second subzone is larger than or equal to a temperature of the first regeneration gas flow at the first inlet of the first subzone.

20. The dryer according to claim 13, wherein a temperature of the second regeneration gas flow at the second inlet of the second subzone is larger than or equal to a temperature of the first regeneration gas flow at the first inlet of the first subzone, and wherein said driver is a motor.

* * * * *